(12) United States Patent
Chen et al.

(10) Patent No.: US 8,766,486 B2
(45) Date of Patent: Jul. 1, 2014

(54) NON-RESONANCE WIRELESS POWER DEVICE

(75) Inventors: Shih Chung Chen, Hsin Chuang (TW); Shu-Mu Chen, Sanchong (TW)

(73) Assignee: Youhua Technology (Shenzhen) Co., Ltd, Shenzhen (CN)

( * ) Notice: Subject to any disclaimer, the term of this patent is extended or adjusted under 35 U.S.C. 154(b) by 1191 days.

(21) Appl. No.: 12/696,035

(22) Filed: Jan. 28, 2010

(65) Prior Publication Data

US 2011/0181118 A1    Jul. 28, 2011

(51) Int. Cl.
*H02J 17/00* (2006.01)
(52) U.S. Cl.
USPC .......................................... 307/104; 320/108
(58) Field of Classification Search
USPC .......................................... 307/104; 320/108
See application file for complete search history.

(56) References Cited

U.S. PATENT DOCUMENTS

2007/0296393 A1* 12/2007 Malpas et al. ................. 323/355
2008/0164840 A1*  7/2008 Kato et al. ..................... 320/108
2008/0197713 A1*  8/2008 Jin ................................. 307/104

* cited by examiner

*Primary Examiner* — Fritz M Fleming
(74) *Attorney, Agent, or Firm* — Garcia-Zamor IP Law; Ruy M. Garcia-Zamor

(57) ABSTRACT

The invention discloses a one-to-multipoint wireless powering method, wherein by using the radiating of magnetic line of force from the high frequency alternating magnetic field in a fixed area; by using the coils that composed of the loop to cut the high frequency magnetic line of force, and powering the electrical equipments after rectifying and filtering the alternating current that generated by the coils cutting; it is realized by the composing of a high frequency alternating magnetic field radiating element and magnetic cutting receiving element, while the high frequency alternating magnetic field radiates the magnetic line of force in a fixed area, and the magnetic cutting receiving element generates the alternating current by cutting the magnetic line of force and powers the electrical equipments after the rectifying and filtering of the alternating current. By adopting the method of radiating of the magnetic line of force and cutting the magnetic line of force, to exchange energy, there is no need to constitute a resonance relationship between power supplier and power receiver, in this way, the function of one-to-multipoint wireless power is achieved; furthermore, there is no need for the consistence for the phase terminal between coils, the receiving end could be placed in any direction within the receiving ranges; it is able to power the electronic devices directly and it is applicable to a wider range.

8 Claims, 2 Drawing Sheets

NON-RESONANCE WIRELESS POWER DEVICE

TECHNICAL FIELD

The invention relates to a one-to-multipoint wireless powering method and a non-resonance wireless power device that is able to implement the method, which can be used for non-contact battery charging or directly powering the electronic equipments.

BACKGROUND ART

Electronic products generally required for the directly supply from the power supply cables, but due to the limitation of the power supply cables, leads to the inconvenience in mobility of electronic products. Therefore, plenty of low-power electronic products use rechargeable batteries for powering, but the rechargeable batteries also need to use the contact point or plug for cable charging. However, the current cable charging method often unable to charge because of the dirty, wear-and-tear of the contact chips, even more the poor contact between the contact points may cause point discharge effect, which will burn out the electronic products or even cause security incidents. And there are also some electronic products that are not applicable to the cable powering or charging, such as water-proof electronic products, human body portable electronic devices, oral-style medical diagnostic equipments, the cell phone and game control units which require frequent usage and charging.

At present, many domestic and foreign enterprises have already introduced the non-contact charging products, but there are still many inadequacies in the product performance and capacity, firstly, the transmission distance is extreme short and range is very small, both the transmitter and the receiver must be closed with each other to work out; secondly, the phase terminal of the transmitting and the receiving coils must be the same, so the receiver cannot be placed in any directly; thirdly, it requires to constitute a resonance relationship between power supplier and power receiver, so as to carry out the power transmission, in this way it could only be a one to one transmission; fourthly, the power transmission is limited, so it could only be used for battery charging by small current.

CONTENTS OF THE INVENTION

Aiming at the shortcomings above in existing technology, the invention is to provide a one-to-multipoint wireless powering method and a non-resonance wireless power device thereof that is able to implement the method, wherein by adopting the method of radiating of the magnetic line of force and cutting the magnetic line of force, to exchange energy, there is no need to constitute a resonance relationship between power supplier and power receiver, in this way, the function of one-to-multipoint wireless power is achieved To solve the shortage of the existing technology, this invention adopts the following technical solution:

A one-to-multipoint wireless powering method, wherein by using the radiating of magnetic line of force from the high frequency alternating magnetic field in a fixed area; by using the coils that composed of the loop to cut the high frequency magnetic line of force, and powering the electrical equipment after rectifying and filtering the alternating current that generated by the coils cutting.

A non-resonancewireless power device, wherein it includes a high frequency alternating magnetic field radiating element and a magnetoelectric transducer receiving element, while the high frequency alternating magnetic field radiates the magnetic line of force in a fixed area, and the magnetoelectric transducer receiving element generates the alternating current by cutting the magnetic line of force and powers the electrical equipments after the rectifying and filtering of the alternating current.

The central processing unit outputs the high frequency AC signal and after converting by the electromagnetic transducer circuits, and by the laminated printed transducer plate into high frequency alternating filed to radiate the magnetic force of line in its nearby fixed area; when the magnetic cutting coils is in the radiation area, the coils that composed of loop will generate the alternating current by cutting the magnetic line of force, and powers the electrical equipments and processor after the alternating current converted by the rectifier and filter circuits into the direct-current power supply.

The foresaid high frequency alternating magnetic field radiating element includes central processing unit, electromagnetic transducer circuits, transducer plate and A/D signal conversion circuits; wherein the central processing unit receives the control signal from the A/D signal conversion circuits and outputs the high frequency impulse signal with assigned frequency to electromagnetic transducer circuits; the transducer plate connects with the electromagnetic transducer circuits, and receives the power output from the electromagnetic transducer circuits to radiate the magnetic line of force in the form of electromagnetic energy to the nearby fixed area.

The foresaid electromagnetic transducer circuits connects with the central processing unit and receives the high frequency impulse signal from the central processing unit and drives the transducer plate to work after converting the high frequency impulse signal.

The foresaid transducer plate radiates the magnetic line of force in the form of electromagnetic energy from the power output of electromagnetic transducer circuits to the nearby fixed area, to realize the energy output.

The foresaid transducer plate is made of multilayer printed platinoid by die-casting of epoxy resin, each layer insulated with each other.

The foresaid magnetoelectric transducer receiving element includes magnetic cutting coils, rectifier and filter circuits, and auxiliary processor, wherein the magnetic cutting coils and its loop capacitance form a closed-loop, and generate the alternating current by cutting the high frequency alternating magnetic field from the radiating element of high frequency alternating magnetic field.

The foresaid A/D signal conversion circuits connects with the central processing unit, meanwhile it receives the AF (Audio Frequency. AF) modulating signal from the magnetoelectric transducer receiving element, then demodulates the AF signal, and outputs to the central processing after the A/D conversion.

The foresaid rectifier and filter circuits connect with the magnetic cutting coils, and convert the alternating current from the magnetic cutting coils into direct-current power supply by rectifying and filtering The auxiliary processor connects with the electrical equipments to detect its electricity utilization status, and passes back the electricity utilization status signal to the central processing unit after AF modulation, then output the high frequency impulse signal to the electromagnetic transducer circuits; the auxiliary processor directly connects with the electrical equipments, such as rechargeable batteries, and passes back the electricity utilization status signal after converting it into AF modulation signal to the central processing unit for related processing, such as display, standby and other movements.

The invention, by adopting the method of radiating of the magnetic line of force and cutting the magnetic line of force, to exchange energy, there is no need to constitute a resonance relationship between power supplier and power receiver, in this way, the function of one-to-multipoint wireless power is achieved; furthermore, there is no need for the consistence for the phase terminal between coils, the receiving end could be placed in any direction within the receiving ranges; meanwhile, by using the specially designed laminated printed transducer plate, it is able to maximize the area of the molecular surface of copper without increasing the inductive reactance of the laminated printed transducer plate, under the condition that the conductor cross-sectional area is the same, in this way it achieves a higher through-put power factor that it is able to power the electronic devices with demand for electricity and power the electronic devices directly, and it is applicable to a wider range.

MODE OF CARRYING OUT THE INVENTION

Figure 1:
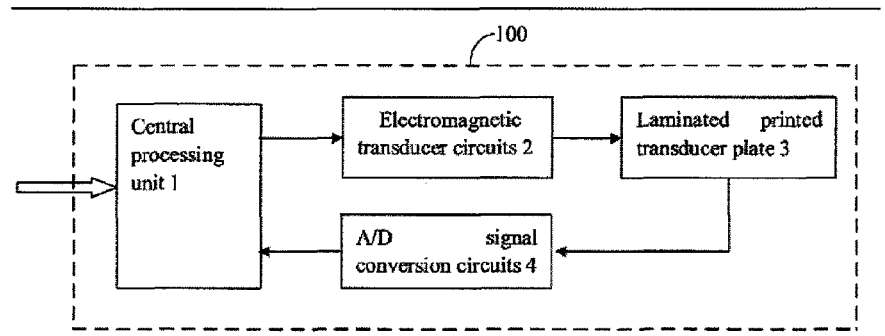
FIG. 1 is the block diagram of the circuits of the high frequency alternating magnetic field radiating element.
Figure 4:
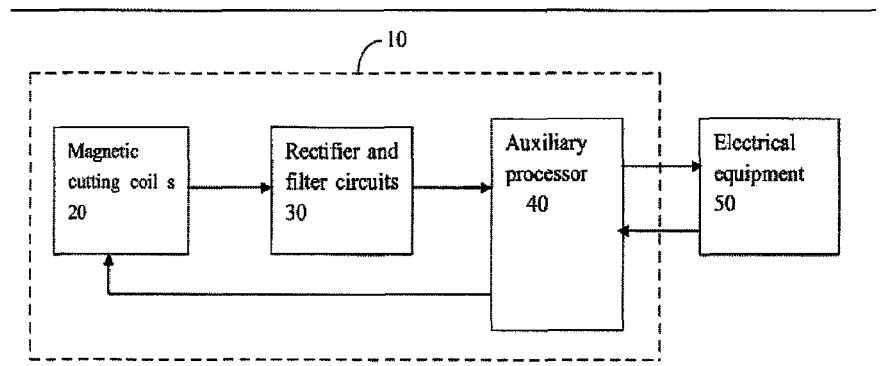
FIG. 4 is the block diagram of the circuits of magnetoelectric transducer receiving element.

Further explanation to the invention is stated below combining with the attached figures:

The non-resonance wireless power device of the invention, wherein it includes a high frequency alternating magnetic field radiating element 100 as shown in FIG. 1 and a magnetoelectric transducer receiving element 10 as shown in FIG. 4; the invention uses the high frequency alternating magnetic field to radiate the magnetic line of force in a fixed area, and the magnetic cutting receiving element to generate the alternating current by cutting the magnetic line of force and powers the electrical equipments 50 after the rectifying and filtering of the alternating current.

As shown in FIG. 1, the high frequency alternating magnetic field radiating element 100 includes central processing unit 1, electromagnetic transducer circuits 2, laminated printed transducer plate 3 and A/D signal conversion circuits 4.

The central processing unit 1 receives the control signal from the A/D signal conversion circuits 4 and outputs the high frequency impulse signal with assigned frequency to electromagnetic transducer circuits 2; the electromagnetic transducer circuits 2 connects with the central processing unit 1 and receives the high frequency impulse signal from the central processing unit 1 and converts the high frequency impulse signal into the power output that is able to drive the laminated printed transducer plate 3 to work; the laminated printed transducer plate 3 connects with the electromagnetic transducer circuits 2, and receives the power output from the electromagnetic transducer circuits 2 to radiate the magnetic line of force in the form of electromagnetic energy to the nearby fixed area. In particular, the central processing unit 1 is in charge of three aspects of work: first, it outputs the high frequency impulse signal with assigned frequency; second, it receives the control signal from the A/D signal conversion circuits 4; third, it processes the high frequency impulse output according to the received control signal, and displays the working status by the LED display screen.

As shown in FIG. 4, the magnetoelectric transducer receiving element 10 includes magnetic cutting coils 20, rectifier and filter circuits 30, and auxiliary processor 40, wherein the magnetic cutting coils 20 and its loop capacitance form a closed-loop, and generate the alternating current by cutting the high frequency alternating magnetic field from the high frequency alternating magnetic field radiating element 100, The rectifier and filter circuits 30 connect with the magnetic cutting coils 20, and convert the alternating current from the magnetic cutting coils 20 into direct-current power supply by rectifying and filtering, and the power the auxiliary processor 40 and electrical equipments 50.

The A/D signal conversion circuits 4 connects with the central processing unit 1, meanwhile it receives the AF modulating signal from the magnetoelectric transducer receiving element 10, then demodulates the AF signal, and outputs to the central processing unit 1 for related processing after the AID conversion. The processor 40 connects with the rectifier and filter circuits 30, and receives working power supply from the rectifier and filter circuits 30. The other function of processor 40 is to connect with the electrical equipments 50 to detect its electricity utilization status, and passes back the electricity utilization status signal after AF modulation to the central processing unit 1 for output after related processing, such as display, standby and other movements.

Figure 2:
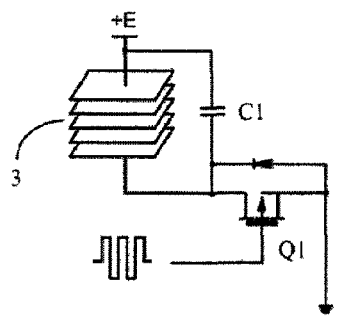
FIG. 2 is the schematic diagram of the electromagnetic transducer circuits.
Figure 3:
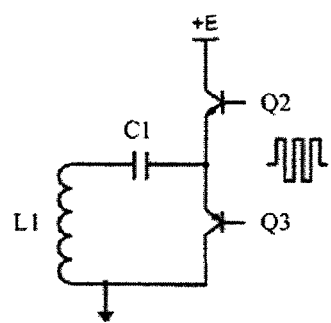
FIG. 3 is the schematic diagram of the general series connection of resonant output circuits.

The electromagnetic transducer circuits 2 of the invention as shown in FIG. 2 is different from the series connection type resonant as shown in FIG. 3 in current existing non-contact point charging equipments in domestic and aboard which uses the power supply direct-acting on the output coils L1 as the high frequency transmitting way, wherein the series resonance circuits supply power to the output coils L1 by using the charging and discharging of the high frequency capacitance C1 that series connects with the output coils L1, in this way, the output power is the stored electrical energy during the charging and discharging of the high frequency capacitance C1. The power supply of the electromagnetic transducer circuits 2 is directly acting on the laminated printed transducer plate 3, which is not limited by the energy from charging and discharging of the high frequency capacitance C1, so it is able to achieve the purpose of high power and high output.

Figure 5:
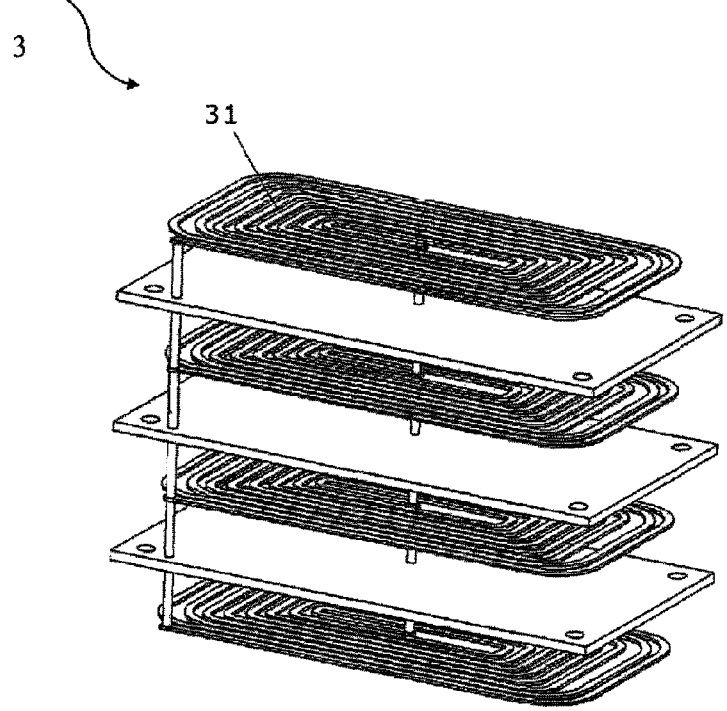
FIG. 5 is the structure diagram of the laminated printed transducer plate.

As shown in FIG. 5, the laminated printed transducer plate 3 is made of multilayer printed platinoid 31 by die-casting of epoxy resin, and the layers of the platinoid 31 depend on the specific power requirements, each layer insulated with each other. It is able to maximize the area of the molecular surface of copper without increasing the inductive reactance of the laminated printed transducer plate 3, under the condition that the conductor cross-sectional area is the same. (Note: the general multi-line shunt-wound coils increase the area of the molecular surface of copper, but because of using multiple strings, it increases the inductive reactance of the coils, thus decreases the current that flowing through in the coils.) By using the electromagnetic transducer circuits 2 with a higher through-put power factor, the function of one-to-multipoint wireless power is achieved.

The invention by adopting the method of radiating of the magnetic line of force and cutting the magnetic line of force, to exchange energy, there is no need to constitute a resonance relationship between power supplier and power receiver, in this way, the function of one-to-multipoint wireless power is achieved; furthermore, there is no need for the consistence for the phase terminal between coils, the receiving end could be placed in any direction within the receiving ranges; it is applicable to a wider range.

The invention claimed is:

1. A non-resonance wireless power device, wherein it includes a high frequency alternating magnetic field radiating element and a magnetoelectric transducer receiving element, while the high frequency alternating magnetic field radiating element radiates the magnetic line of force in a fixed area, and the magnetoelectric transducer receiving element generates the alternating current by cutting the magnetic line of force and powers the electrical equipments after the rectifying and filtering of the alternating current;

wherein the high frequency alternating magnetic field radiating element includes a central processing unit, an electromagnetic transducer circuits, a laminated printed transducer plate and an A/D signal conversion circuits: wherein the central processing unit receives the control signal from the A/D signal conversion circuits and outputs the high frequency impulse signal with assigned frequency to the electromagnetic transducer circuits, the A/D signal conversion circuits connects with the central processing unit, and the A/D signal conversion circuits directly and electrically connects with the laminated printed transducer plate, meanwhile it receives an AF (Audio Frequency) modulating signal from the magnetoelectric transducer receiving element, then demodulates the AF signal, and outputs to the central processing unit after the A/D conversion.

2. A non-resonance wireless power device as set forth in claim 1, characterized in that the laminated printed transducer plate connects with the electromagnetic transducer circuits, and receives the power output from the electromagnetic transducer circuits to radiate the magnetic line of force in the form of electromagnetic energy to the nearby fixed area.

3. A non-resonance wireless power device as set forth in claim 2, characterized in that the electromagnetic transducer circuits connects with the central processing unit and receives the high frequency impulse signal from the central processing unit and drives the laminated printed transducer plate to work after converting the high frequency impulse signal.

4. A non-resonance wireless power device as set forth in claim 2, characterized in that the laminated printed transducer plate radiates the magnetic line of force in the form of electromagnetic energy from the power output of electromagnetic transducer circuits to the nearby fixed area, to realize the energy output.

5. A non-resonance wireless power device as set forth in claim 2, characterized in that the laminated printed transducer plate is made of multilayer printed platinoid by die-casting of epoxy resin, each layer insulated with each other.

6. A non-resonance wireless power device as set forth in claim 1, characterized in that the magnetoelectric transducer receiving element includes magnetic cutting coils, rectifier and filter circuits, and auxiliary processor, wherein the magnetic cutting coils and its loop capacitance form a closed-loop, and generate the alternating current by cutting the high frequency alternating magnetic field from, the radiating element of high frequency alternating magnetic field.

7. A non-resonance wireless power device as set forth in claim 6, characterized in that the rectifier and filter circuits connect with the magnetic cutting coils, and convert the alternating current from the magnetic cutting coils into direct-current power supply by rectifying and filtering.

8. A non-resonance wireless power device as set forth in claim 6, characterized in that the auxiliary processor connects with the rectifier and filter circuits, and receives working power supply from the rectifier and filter circuits; while auxiliary processor connects with the electrical equipments to detect its electricity utilization status, and passes back the electricity utilization status signal to the central processing unit after AF modulation, then output the high frequency impulse signal to the electromagnetic transducer circuits.

* * * * *